United States Patent
Dombrowski et al.

(10) Patent No.: US 9,006,331 B2
(45) Date of Patent: Apr. 14, 2015

(54) LATEX PARTICLES IMBIBED WITH A THERMOPLASTIC POLYMER

(75) Inventors: Gary William Dombrowski, West Chester, PA (US); Zhenwen Fu, Lansdale, PA (US); Caroline Slone, Ambler, PA (US); Andrew Swartz, Fleetwood, PA (US)

(73) Assignee: Rohm and Haas Company, Philadelphia, PA (US)

( * ) Notice: Subject to any disclaimer, the term of this patent is extended or adjusted under 35 U.S.C. 154(b) by 297 days.

(21) Appl. No.: 13/462,095

(22) Filed: May 2, 2012

(65) Prior Publication Data

US 2012/0295023 A1 Nov. 22, 2012

Related U.S. Application Data

(60) Provisional application No. 61/487,018, filed on May 17, 2011.

(51) Int. Cl.
| | |
|---|---|
| *C08L 75/02* | (2006.01) |
| *C08L 33/06* | (2006.01) |
| *C08L 67/00* | (2006.01) |
| *C08L 75/04* | (2006.01) |
| *C09J 4/00* | (2006.01) |
| *C09D 4/00* | (2006.01) |
| *C08G 18/48* | (2006.01) |
| *C08G 18/50* | (2006.01) |
| *C08G 18/62* | (2006.01) |
| *C08G 18/65* | (2006.01) |
| *C08G 18/66* | (2006.01) |
| *C08G 18/75* | (2006.01) |
| *C08G 18/08* | (2006.01) |
| *C08G 18/12* | (2006.01) |
| *C09D 175/04* | (2006.01) |
| *C08G 18/34* | (2006.01) |
| *C08G 59/50* | (2006.01) |
| *C08L 63/00* | (2006.01) |

(52) U.S. Cl.
CPC ... *C09J 4/00* (2013.01); *C09D 4/00* (2013.01); *C08G 18/4854* (2013.01); *C08G 18/5024* (2013.01); *C08G 18/6225* (2013.01); *C08G 18/6517* (2013.01); *C08G 18/6692* (2013.01); *C08G 18/755* (2013.01); *C08G 18/758* (2013.01); *C08G 18/0823* (2013.01); *C08G 18/0866* (2013.01); *C08G 18/12* (2013.01); *C09D 175/04* (2013.01); *C08G 18/348* (2013.01); *C08G 59/50* (2013.01); *C08L 63/00* (2013.01)

(58) Field of Classification Search
CPC ......... C08L 75/02; C08L 33/06; C08L 67/00; C08L 75/04
USPC .................. 524/507, 502, 528, 539
See application file for complete search history.

(56) References Cited

U.S. PATENT DOCUMENTS

| | | | |
|---|---|---|---|
| 6,235,811 B1 | 5/2001 | Mahlon et al. | |
| 2010/0028483 A1 | 2/2010 | Wasserfuhr et al. | |

FOREIGN PATENT DOCUMENTS

| | | | |
|---|---|---|---|
| JP | 2004263027 A | * | 9/2004 |
| JP | 2004354706 A | * | 12/2004 |

* cited by examiner

*Primary Examiner* — Kelechi Egwim
(74) *Attorney, Agent, or Firm* — Reid S. Willis

(57) ABSTRACT

The present invention relates to a process for imbibing a step-growth polymer into thermoplastic latex particles and a composition made by such a process. The composition is useful, for example, as a coating, an adhesive, a sealant, a primer, a caulk, a stain, or a filler for a variety of substrates.

4 Claims, No Drawings

LATEX PARTICLES IMBIBED WITH A THERMOPLASTIC POLYMER

BACKGROUND OF THE INVENTION

Coatings prepared from aqueous dispersions of polymer particles can be deficient in gloss, resistance properties, and hardness development as compared to those prepared from solvent-based polymers. Dispersions containing a blend of different aqueous polymer dispersions—for example, a blend of acrylic and polyurethane dispersions or a blend of acrylic and epoxy dispersions—are known to improve coating properties; however, blends in the wet state can exhibit storage instability and be solids limited. In addition, coatings derived from these blends can exhibit performance issues due to latex incompatibility and polymer phase demixing.

One approach for improving coatings properties is the use of composite particle technology as described by Guyot et al. in "Hybrid Polymer Latexes" in Prog. Polym. Sci. 32 (2007) 1439-1461. Composite particles contain at least two distinct polymers that may form a homogenous blend within the particle or distinct microphases that are more intimately mixed than physical blends due to their method of preparation. Such composite particles can be prepared, for example, by swelling a dispersion of polymer particles such as polyurethane particles with an ethylenically unsaturated monomer such as acrylic and methacrylic monomers, then polymerizing these monomers to form polyacrylic-polyurethane particles. Alternatively, different types of pre-formed polymers can be co-dispersed into water from either the bulk phase or from an organic solution.

Moreover, monomers can serve a dual role: as a solvent for the preparation of a prepolymer and, subsequently, as a second polymer. For example, acrylic and methacrylic monomers can be used as a solvent to prepare a polyurethane prepolymer, which is subsequently dispersed in water and then chain extended with diamines to build molecular weight. The (meth)acrylic monomers are subsequently polymerized by radical polymerization.

In yet another example of forming composites, a dispersion of polymer particles can be mixed with a monomer or a prepolymer, which is substantially grafted to the first polymer by way of pendant functional groups.

The above-described processes typically result in composites that are either substantially crosslinked and, therefore, are limiting for applications where low temperature film-forming is desired, or that disadvantageously require organic solvents for manufacture or that contain organic solvents in their final dispersion, or are otherwise energy intensive to prepare.

The imbibed polymers are limited to low molecular weight polymers due to viscosity buildup, and the final dispersions are limited to lower potential solids content. A low molecular weight imbibed polymer can negatively impact the properties of the composite materials in its final application, such as a decrease in hardness, scratch resistance and dirt pick-up resistance of a coating made from such a material. It would therefore be advantageous to discover an efficient way to make composites that do not require organic solvents, that have little or no crosslinking, and that have capability for high solids content and high molecular weight.

SUMMARY OF THE INVENTION

In a first aspect, the present invention is a method comprising:
a) combining a stable aqueous dispersion of polymer particles with a hydrophobic first monomer that is capable of forming a polymer by way of step-growth polymerization;
b) allowing the polymer particles to swell to substantial equilibrium;
c) contacting the stable aqueous dispersion of step b) with a second monomer that is capable of reacting with the first monomer to form a thermoplastic step-growth polymer, which second monomer is characterized by having sufficient hydrophobicity to at least partially absorb into the polymer particles;
d) polymerizing the first and second monomers to form the thermoplastic step-growth polymer.

In a second aspect, the present invention is a composition comprising a stable aqueous dispersion of polymer particles imbibed with a thermoplastic step-growth polymer which is a polyhydroxyamino ether, a polyhydroxythiol ether, a polyhydroxyamino ester, a polyester, a polyurethane, a polyurea, or a polysiloxane, with the proviso that when the thermoplastic step-growth polymer is a polyurethane or a polyurea, the step-growth polymer has a substantial absence of acid pendant groups, and the polymer particles are substantially free of pendant amine or hydrazine groups.

The process of the present invention addresses a need in the art by providing a mechanism for building molecular weight of the imbibed polymer inside the latex particle, thereby eliminating viscosity limitations of building high molecular polymers in solution. The process provides a convenient way of preparing a shelf-stable one-pot thermoplastic composite of latex particles imbibed with a thermoplastic step-growth polymer.

DETAILED DESCRIPTION OF THE INVENTION

In the first step of the process of the present invention, a stable aqueous dispersion of polymer particles (i.e., a latex) is combined with a hydrophobic first monomer that is capable of forming a polymer by way of step-growth polymerization. The latex can be prepared through free radical emulsion or suspension addition polymerization or by dispersion of a pre-formed polymer under shear into an aqueous medium. Preferably, the latex is prepared using conventional free radical emulsion polymerization techniques. Examples of suitable latexes include acrylic, styrene-acrylic, styrene-butadiene, urethane, ester (including polyester and alkyd), olefin, vinyl chloride, ethylene vinyl acetate, and polyvinyl acetate based latexes, with acrylic and styrene-acrylic latexes being preferred.

In one preferred aspect, the latex is an acrylic latex. Monomers suitable for the preparation of acrylic latexes include (meth)acrylates such as methyl (meth)acrylate, ethyl (meth)acrylate, butyl (meth)acrylate, 2-ethylhexyl (meth)acrylate, and combinations thereof. As used herein, the term "(meth)acrylate" refers to acrylates or methacrylates. Similarly, the term "(meth)acrylic acid" refers to methacrylic acid or acrylic acid.

Additional monomers may be used to prepare the acrylic latex including carboxylic acid monomers such as (meth)acrylic acid and itaconic acid, and salts thereof; sulfonic acid monomers such as sodium styrene sulfonate and acrylamidomethyl-propane sulfonate and salts thereof; and phosphoric acid monomers such as phosphoethylmethacrylate and salts thereof. Monomers such as styrene, acrylonitrile, and acetoacetoxyethyl methacrylate (AAEM), as well as monomers capable of imparting co-curable functionality such as glycidyl (meth)acrylates and hydroxyalkyl (meth)acrylates, may also be used in the preparation of the acrylic latex.

In instances where AAEM is used, it may be desirable to post-react the acrylate polymer with a primary amine or ammonia to form a polymer containing the corresponding enamine, as illustrated:

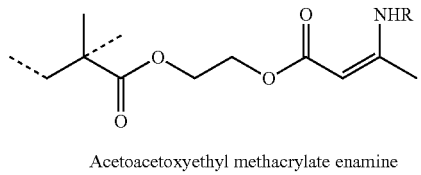

Acetoacetoxyethyl methacrylate enamine where R is H or an alkyl group and where the dotted lines represent the points of attachment to the polymer backbone.

In certain embodiments, it may be advantageous to incorporate into the acrylic polymer small amounts of copolymerized multi-ethylenically unsaturated monomer groups, including allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene. It may also be advantageous to incorporate such monomer groups non-uniformly into the polymer to form multiphase polymer particles to create a core-shell, hemispherical, or occluded morphology.

Chain transfer agents may be used to prepare these latexes, examples of which include dodecylmercaptan, butylmercaptopropionate, methylmercaptopropionate, and mercaptopropionic acid.

In certain embodiments, it may be beneficial to use as the host latex multiphase polymer particles such as those disclosed by Duda et al. in *Langmuir* 2005, 21, 1096-1102. The preparation of these morphologies is well known in the art. A multi-stage emulsion polymerization process usually results in the formation of at least two mutually incompatible polymer compositions, thereby resulting in the formation of at least two phases. The mutual incompatibility of two or more polymer compositions and the resultant multiphase structure of the polymer particles may be determined in a variety of ways including scanning electron microscopy using staining techniques to emphasize the difference between the phases.

Multiphase polymer particles may be of various geometries including core/shell or core/sheath particles, core/shell particles with shell phases incompletely encapsulating the core, and core/shell particles with a multiplicity of cores. The final properties of these latexes are often achieved by balancing the monomer compositions of the individual phases and their relative proportions. For the present invention, it may be advantageous to use disparate or similar $T_g$'s, and similar or disparate hydrophobicities. The end use application of the latex usually dictates the properties of each polymer phase.

The morphology of the host latex is not limited to strictly organic materials. It may be advantageous to make use of polymers that have embedded or adsorbed inorganic phases or domain, for example, polymer-encapsulated opacifying pigment particles comprising i) opacifying pigment particles having a diameter in the range of 100 nm to 500 nm and an index of refraction from 1.8 to 4.5; ii) an encapsulating polymer that contains polymerized units of a sulfur acid monomer, or a salt thereof, and iii) a polymeric dispersant for the encapsulated opacifying pigment particles and the polymer, which dispersant contains sulfur acid groups, or salts thereof, and amine groups, as described, for example, in U.S. Patent Publication US 2010/0298483 A1.

The hydrophobic first monomer is characterized by a) having sufficient hydrophobicity to migrate into the polymer particles and b) being able to form a thermoplastic step-growth polymer by way of reaction with a suitable second monomer. In one aspect, the hydrophobic first monomer is an electrophile, examples of which include diisocyanates and dioxiranes.

Examples of suitable diisocyanates include aliphatic diisocyanates including 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis (isocyanatocyclohexane), 1,4-cyclohexylene diisocyanate, 1,3-cyclohexanediylbis(methylene)diisocyanate, 1,4-cyclohexanediylbis(methylene)diisocyanate, 1-isocyanato-3-isocyanatomethyl-3,5,5-trimethylcyclohexane, m-tetramethylxylylene diisocyanate, and 1,5-tetrahydronaphthylene diisocyanate.

Examples of suitable dioxiranes are diglycidyl ethers and esters such as the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedimethanol diglycidyl ether, 1,3-cyclohexanedmethanol diglycidyl ether, the diglycidyl ester of hexahydrophthalic acid, and novolac resins, and combinations thereof. A commercially available diglycidyl ether is D.E.R.™ 331 Liquid Epoxy Resin (a Trademark of The Dow Chemical Company or its Affiliates).

The hydrophobic first monomer is advantageously added to the latex with agitation, either neat, in solution, or as an emulsion; sufficient time is then allowed for the polymer particles to swell to an equilibrium; alternatively or additionally, where the first hydrophobic monomer is sufficiently hydrophobic to form a distinct phase from the aqueous phase, equilibrium can be ascertained by the disappearance this distinct phase. In certain embodiments, transport of the hydrophobic monomers may be facilitated through the use of phase transfer catalysts such as cyclodextrin. Either the cessation of swelling of the polymer particles or the substantial disappearance of a distinct phase suggests the substantially complete migration of the first hydrophobic monomer into or onto the polymer particles. In one aspect, particularly where the latex is an acrylic latex, the second monomer is not added until the weight average particle size of the dispersion is at least 90%, more preferably at least 95% of the theoretical maximum size. It may also be advantageous to add the first monomer above ambient temperature, particularly where the first monomer is non-reactive with water, to facilitate transport of the monomer into the polymeric phase.

After the polymer particles swell to substantial equilibrium, a second monomer that is capable of reacting with the hydrophobic first monomer to form a thermoplastic step-growth polymer is contacted with the stable aqueous dispersion of swollen polymer particles. The second monomer is preferably added to the latex containing the hydrophobic first monomer, either neat or in solution, preferably as an aqueous solution. The second monomer is further characterized by having sufficient hydrophobicity to at least partially absorb into the polymer particles. In certain embodiments, transport of the hydrophobic second monomer may also be facilitated by the use of phase transfer catalysts such as cyclodextrin.

When the first or second monomer is added as an aqueous dispersion, the dispersion is stabilized with a stabilizing amount of a surfactant, preferably at a concentration in the range of about 0.5 to about 5% by weight. Nonionic surfactants are preferred, including APEO free, non-ionic wetting agents such as polyalkylene oxide block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X-405 Octylphenol Ethoxylate (A Trademark of The Dow Chemical Company or its Affiliates). When the first or second monomer is combined with the latex as a neat compound, imbibing is facilitated by agitation at or above room temperature.

In one aspect, the second monomer is a nucleophile capable of forming a thermoplastic step-growth polymer with the electrophile; the selection of suitable second monomers depends on the functionality of the hydrophobic first monomer; for example, where the hydrophobic first monomer is a diglycidyl ether, suitable second monomers include diols, dithiols, primary amines, alkanol primary amines, thioalkyl primary amines, di-secondary amines, mercaptoalcohols, and silyl alkyl primary amines; preferred second monomers for diglycidyl ethers are primary amines, alkanol primary amines, and di-secondary amines. Examples of specific monomers suitable for reaction with diglycidyl ethers include ethanolamine, propyl amine, butyl amine, amyl amine, hexylamine, cyclohexyl amine, octylamine, 2-ethylhexylamine, and piperazine.

Where the hydrophobic first monomer is a diisocyanate, suitable second monomers include difunctional diisocyanate reactive compounds such as diols, diamines, dithiols, alkanol amines, thioamine, and mercaptoalcohol, with diols, diamines, and alkanol amines being preferred. Examples of specific difunctional diisocyanate reactive compounds include diols such as 1,4-butanediol, polyalkoxyether diols, polyester diols, poly tetramethylene ether diols, polycarbonate diols, dicyclohexanediol,1,3-dicyclohexanedimethanol, 1,4-dicyclohexanedimethanol; and diamines such as ethylene diamines, polyoxypropylene diamine, and N,N'-bis(2-propyl)polyoxypropylenediamine. The difunctional diisocyanate reactive agent is characterized by having sufficient affinity for the polymer particles to become imbibed to some extent. In certain embodiments it may be necessary to increase the temperature to form the polyurethane or polyurera step-growth polymer.

As noted above, the latex particles may include functional groups, such as hydroxyl groups or glycidyl ether groups, that are capable of reacting with either the first or second monomer; under such circumstances, the imbibed step-growth polymer may not only be physically incorporated into or onto the latex, but chemically bound to the latex particles.

It may be advantageous to reverse the order of addition of monomers; thus, the first monomer may be nucleophilic and the second monomer may be electrophilic.

As used herein, the term "thermoplastic step-growth polymer" refers to a polymer or mixture of polymers prepared by the reaction of multifunctional monomers. Notably, because the polymer is thermoplastic, the multifunctional monomers tend to be primarily, if not exclusively, difunctional monomers. As used herein, the term "difunctional monomer" refers to a monomer with exactly two active sites; thus, a primary amine and a di-secondary amine are difunctional monomers for diglycidyl ethers in the sense that these amines have two active hydrogen atoms. On the other hand, diamines such as 1,6-hexamethylenediamine are difunctional for diisocyanates in the sense that each amino group is necessary to form the linear thermoplastic polyurea.

In a further step, the hydrophobic first monomer and second monomer are allowed to react to form the thermoplastic step-growth polymer. Examples of thermoplastic step-growth polymers include polyhydroxyamino ethers, polyhydroxythiol ethers, polyhydroxyamino esters, polyurethanes, polyesters, polysiloxanes, polysulfides, polycarbonates, and polyureas. Preferred thermoplastic step-growth polymers include polyhydroxyamino ethers, polyurethanes, and polyureas.

In a second aspect, the present invention is a composition comprising a stable aqueous dispersion of polymer particles imbibed with a thermoplastic step-growth polymer which is a polyhydroxyamino ether, a polyhydroxythiol ether, a polyhydroxyamino ester, a polyester, a polyurethane, a polyurea, or a polysiloxane. If the thermoplastic step-growth polymer is a polyurethane or a polyurea, the step-growth polymer has a substantial absence of acid groups, and the polymer particles are substantially free of pendant primary amine or hydrazine groups.

As used herein, the term "substantial absence of acid groups" refers to less than 0.1%, preferably less than 0.01%, and most preferably less than 0.001% by weight of acid groups or salts thereof, based on the weight of the imbibed polyurethane or polyurea. Most preferably, the polyurethane or polyurea contain no pendant acid groups. Also most preferably, the imbibed polymer, in general, contains no pendant acid groups.

As used herein, the term "substantially free of remnants of pendant primary amine or hydrazine groups" refers to less than 0.1%, preferably less than 0.01%, and most preferably less than 0.001% by weight of pendant amine groups, based on the weight of the imbibed polyurethane or polyurea in the pre-reacted state. Thus, if the primary amine attached to a polymer particle is depicted as follows:

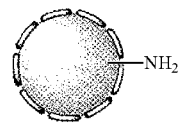

the remnant can be visualized as illustrated:

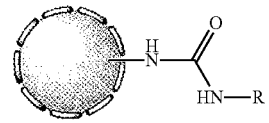

Preferably, the polymer particles in the unreacted state contain no primary amine or hydrazine groups.

High solids content imbibed latexes, that is, latexes with solids content of at least 40 weight percent and particularly in the range of 45-60 weight percent, based on the total weight of the latex, are achievable with the composition of the present invention. Moreover, these imbibed latexes, as distinct from those of the prior art, can be modified to include surprisingly high levels of the thermoplastic step-growth polymer, typically up to 60 weight percent, including 30 to 50 weight percent, based on the weight of the thermoplastic particles and the thermoplastic step-growth polymer. These imbibed latexes can be prepared without solvents and therefore are capable of achieving a virtual absence of VOCs.

The imbibed latex composition is useful as a one-pot system, that is, it does not require an external hardener, and is free or substantially free of thermosetting polymers that adversely affect film formation at ambient temperatures. It has been surprisingly been discovered that such systems are shelf-stable and that the properties of the final coatings are superior to those that are not formed from compositions containing the imbibed thermoplastic step-growth polymers described herein.

The imbibed latex composition according to the present invention may further include one or more of the following additives: Solvents; thickeners; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated titanium dioxide, zinc oxide, or lithopone; polymers or polymer emulsions adsorbing or bonding to the surface of pigments such as titanium dioxide; hollow pigments, including pigments having one or more voids; dispersants, such as aminoalcohols and polycarboxylates; coalescents; additional surfactants; adhesion promoters; tackifiers; waxes; defoamers; preservatives, such as biocides, mildewcides, fungicides, algaecides, and combinations thereof; flow agents; leveling agents; and additional neutralizing agents, such as hydroxides, amines, ammonia, and carbonates.

The compositions can be formulated for a number of applications including coatings, adhesives, sealants, primers, caulks, stains, or fillers.

The compositions of the present invention and the process of the present invention are useful for coating any of a number of substrates, including metal, plastic, concrete, wood, asphalt, hair, paper, leather, rubber, foam, or textiles.

EXAMPLES

The following examples are for illustrative purposes only and are not intended to limit the scope of the invention.

ABBREVIATIONS

Butyl acrylate BA
2-Ethylhexyl acrylate EHA
Methyl methacrylate MMA
ROCRYL™ 400 (Hydroxyethyl methacrylate) HEMA
Methacrylic acid MAA
Phosphoethylmethacrylate PEM
Acetoacetoxyethyl methacrylate AAEM
Styrene STY
n-Dodecylmercaptan nDDM
t-Butylhydroperoxide, 70% tBHP
Isoascorbic Acid IAA
Ammonium persulfate, 99% APS
Triton XN-45S (Polyethylene glycol 4-tert-octylphenyl ether) Surfactant A
Disponil FES-32 (Alkyl polyethoxysulfate, Na salt) Surfactant B
Triton X-405 (Polyoxyethylene(40)isooctylphenyl ether) Surfactant C
Ethylenediamine tetraacetic acid, sodium salt EDTA
Isophorone diisocyanate IPDI
4,4'-methylenedicyclohexyl diisocyanate H12MDI
Unoxol diol (mixture of 1,3- and 1,4-cyclohexanedimethanol) UD
Terathane 250 (Polytetramethylene ether glycol, Mn=250) T250
Terathane 1400 (Polytetramethylene ether glycol, Mn=1400) T1400
Terathane 2000 (Polytetramethylene ether glycol, Mn=2000) T2000
Triethylamine TEA
Ethylene diamine EDA
1,2-Propane Diamine PDA
Dimethylpropionic acid DMPA
Jeffamine SD-231 (N,N'-bis(2-propyl)polyoxypropylene-diamine)) SD231
Minimum Film Formation Temperature MFFT
Glass Transition Temperature Tg
N-methyl pyrrolidinone NMP
ROCYRL is a Trademark of The Dow Chemical Company or its Affiliates.

Intermediate 1

Preparation of Styrene-Acrylic Latex for Modification with Thermoplastic Polymer A monomer emulsion was prepared by mixing deionized water (625.5 g), Surfactant A (26.3 g), 2-EHA (666.0 g), MMA (580.0 g), STY (524.0 g), HEMA (200.0 g), MAA (30.0 g) and nDDM (20.0 g) in a vessel. A separate flask was charged with deionized water (828.2 g) and then brought to 88° C. under a $N_2$ purge. The flask was charged with a solution of APS (4.1 g) and aqueous ammonia (2.0 g) in deionized water (46.0 g), Polymer Seed A (53% BA/47% MMA, 41% solids content, 60 nm particle size, 141.5 g) and deionized water (23.0 g) as a rinse. The monomer emulsion was fed to the reactor at a rate of 8.3 g/min for 20 min, and then increased to a rate of 16.6 g/min for 160 min, maintaining a reactor temperature of 85° C. A mixture of 2.0 g of APS, 2.0 g of aqueous ammonia and 96.6 g of deionized water was added to the reactor concurrently with the monomer emulsion feed at a rate of 0.28 g/min for the first 20 min and a rate of 0.55 g/min for 160 min.

After completion of addition, the monomer emulsion line was rinsed with deionized water (84.4 g) and the reactor was cooled to 75° C., during which time a mixture of a 0.15% aqueous solution of iron sulfate heptahydrate (13.4 g) and a 1.0% aqueous solution of EDTA (1.2 g) was added, and then a separate solution of tBHP (1.5 g in 30.7 g deionized water) was added. A solution of IAA (1.5 g in 38.3 g of deionized water) was added at 75° C. over 15 min and a second tBHP solution (1.5 g in 30.7 g deionized water) was added. The reactor was then cooled to 65° C. and another redox pair of tBHP (1.5 g in 9.2 g deionized water) and IAA (0.8 g in 14.6 g of deionized water) was added. Water (61.9 g) was charged to the reactor and the contents were then cooled to 40° C. The latex was passed through 100 and 325 mesh screens, and characterized for solids, pH, particle size, $T_g$ and MFFT (Table 1).

Intermediates 2-4

Preparation of Styrene-Acrylic Latex for Modification with Thermoplastic Polymer Latex polymer Intermediates 2-4 were prepared using substantially the same procedure as detailed for Intermediate 1. The weights of monomers used as well as percent solids, pH, particle size, $T_g$, and MFFT are detailed in Table 1.

Latex polymer Intermediates 2-4 were prepared using substantially the same procedure as detailed for Intermediate 1. The weights of monomers used as well as percent solids, pH, particle size, $T_g$, and MFFT are detailed in Table 1.

Weight average particle size in nanometers (nm) was determined via light scattering using a 90-Plus Particle Size Analyzer from Brookhaven Instruments Corporation. Glass transition temperature ($T_g$) was determined via Modulated DSC using a Thermal Associates Differential Scanning calorimeter by pre-heating the sample to 150° C. for 5 min, cooling to −90° C., and then reheating the sample to 150° C. at a rate of 7° C./min Minimum Film Formation Temperature (MFFT) was determined according to ASTM D2354 using a MFFT Bar instrument from Paul N. Gardener Company, Inc. The percent diol that reacted was determined by isolating the unreacted diol by extraction in tetrahydrofuran and measuring the amount present via liquid injection GC using an Agilent 6890C Liquid Chromatograph with a dual column (Column A. Restek RTX-200, 30 m×0.32 mm×1 μm; Column B: DB-wax 30 m×0.32 mm×1 μm).

TABLE 1

Intermediate Styrene-Acrylic Latexes

|  | Int. 1 | Int. 2 | Int. 3 | Int. 4 |
|---|---|---|---|---|
| DI Water (g) | 625.5 | 625.3 | 625.3 | 625.5 |
| Surfactant A (g) | 26.3 | 25.8 | 25.8 | 26.3 |
| 2-EHA (g) | 666.0 | 666.0 | 686.0 | 706.0 |
| MMA (g) | 580.0 | 580.2 | 660.2 | 740.0 |
| STY (g) | 524.0 | 524.7 | 524.6 | 524.0 |
| HEMA (g) | 200.0 | 200.0 | 100.0 | — |
| MAA (g) | 30.0 | 30.2 | 30.2 | 30.0 |
| nDDM (g) | 20.0 | 20.0 | 20.0 | 20.0 |
| Particle Size (nm) | 201 | 211 | 182 | 202 |
| Latex Solids | 52% | 52% | 53% | 52% |
| pH | 5.6 | 5.8 | 6.0 | 5.7 |
| $T_g$ (° C.) | 25 | 30 | 27 | 29 |
| MFFT (° C.) | 30 | 29 | 29 | 28 |

Intermediate 5

Preparation of Styrene-Acrylic Latex for Modification with Thermoplastic Polymer A monomer emulsion was prepared by mixing deionized water (486.7 g), Surfactant B (45.2 g), 2-EHA (1075.9 g), MMA (360.7 g), STY (500.2 g) and PEM (64.0 g) in a vessel. A separate flask was charged with deionized water (1081.5 g) and Surfactant B (1.3 g) and then brought to 87° C. under a $N_2$ purge. The flask was then charged with 1.9 weight % of the monomer emulsion (47.9 g) and a deionized water rinse (21.6 g), followed by the addition of an APS solution (6.3 g in 54.1 g deionized water). The monomer emulsion was fed to the reactor at a rate of 10.55 g/min for 10 min, and then increased to a rate of 22.06 g/min for 110 min, maintaining a reactor temperature of 86° C. An APS solution (2.7 g in 86.5 g of deionized water) was added to the reactor concurrently with the monomer emulsion feed at a rate of 0.37 g/min for the first 10 min and a rate of 0.78 g/min for 110 min.

After completion of the addition, the monomer emulsion line was rinsed with deionized water (86.5 g) and the reactor temperature was held at 86° C. for 15 min. An ammonia solution was then added over 5 min (21.6 g ammonia in 5.4 g of deionized water) and the reactor was cooled to 80° C. after stirring for 5 min. At 80° C., a mixture of a 0.15% aqueous solution of iron sulfate heptahydrate (13.3 g), a 1.0% aqueous solution of EDTA (2.05 g) and deionized water (5.4 g) was added over 5 min, and then held at 80° C. for 5 min. A solution of tBHP (1.4 g in 21.6 g deionized water) was added and then a solution of IAA (0.97 g in 21.6 g of deionized water) was added over 15 min while cooling to 70° C. The contents of the reactor were held at 70° C. for 10 min and then set to cool further. At 65° C. another redox pair of tBHP (0.87 g in 16.2 g deionized water) and IAA (0.61 g in 16.2 g of deionized water) was added. The reactor temperature was held at 65° C. for 15 min and then cooled to 40° C. The latex was passed through 100 and 325 mesh screens, and characterized for solids, pH, particle size, $T_g$ and MFFT (Table 2).

Intermediates 6-8

Preparation of Styrene-Acrylic Latex for Modification with Thermoplastic Polymer Latex polymer Intermediates 6-8 were prepared using substantially the same procedure as detailed for Intermediate 5, except that 3.8 weight % of the monomer emulsion was charged to the reactor as the seed for Intermediates 6 & 7. The weights for the individual monomer used as well as percent solids, pH, particle size, Tg and MFFT are detailed in Table 2.

TABLE 2

Intermediate Styrene-Acrylic Latexes

|  | Int. 5 | Int. 6 | Int. 7 | Int. 8 |
|---|---|---|---|---|
| DI Water (g) | 486.7 | 486.7 | 486.7 | 486.7 |
| Surfactant B (g) | 45.2 | 45.2 | 45.2 | 45.2 |
| 2-EHA (g) | 1075.9 | 881.2 | 616.2 | 516.2 |
| MMA (g) | 360.7 | 555.4 | 820.3 | 820.3 |
| STY (g) | 500.2 | 500.2 | 500.2 | 500.2 |
| PEM (g) | 64.0 | 64.0 | 64.0 | 64.0 |
| AAEM (g) | — | — | — | 100.0 |
| Particle Size (nm) | 146 | 145 | 143 | 147 |
| Latex Solids | 50% | 51% | 52% | 50% |
| pH | 3.5 | 3.7 | 4.1 | 3.3 |
| $T_g$ (° C.) | −5 | 14 | 41 | 44 |
| MFFT (° C.) | 5 | 16 | 46 | 49 |

Intermediate 9

Preparation of Polyurethane Dispersion for Modification with Thermoplastic Polymer The polyols (165.0 g of T1400 and 165.0 g of T2000) and DMPA (33.0 g) were charged into a reactor along with 137.5 g of NMP. The reactor contents were heated at 60° C. for 30 min under a nitrogen sweep. H12MDI (187.0 g) was added to reactor and the temperature was increased to 95° C. After 4 h at 95° C., the reactor was cooled to 70° C. and TEA (23.4 g) was added. The TEA was stirred in over 10 min. Deionized water (808.15 g) was added to a separate dispersion vessel. The polyurethane prepolymer mixture was slowly added over 15 min to the deionized water with agitation to prepare an aqueous dispersion. After 5 min, a solution of PDA (16.0 g in 37.2 g deionized water) was added over 12 min. The resulting polyurethane dispersion was passed through a 100-mesh screen and characterized for solids, pH and particle size (35.2% solids, pH of 6.2, particle size of 40 nm).

Intermediate 10

Preparation of Alkyd Dispersion for Modification with Thermoplastic Polymer

Intermediate 10 was prepared by first preparing the alkyd resin and then subsequently dispersing the resin in water. The synthesis protocol used in the preparation of the alkyd resin was a two-stage alcoholysis-polyesterification method. In the first stage, a large scale alcoholysis was carried out, with an aliquot of the alcoholysis product being used in the second polyesterification step. To a 5-L three-neck round-bottom flask was added sunflower oil. A glass stir rod and paddle were placed in the middle joint of the flask. The flask was attached to a lattice with overhead stirring, and an oil bath at room temperature was raised to submerge the flask. The set-point on the bath was 220° C. and heating and stirring were started. To the stirred sunflower oil, pentaerythritol (PE) and dibutyltin oxide (DBTO) (1200 ppm on charge) were added. Once all reactants were added, a packed condenser with a set point of 95° C. was attached to one of the side joints and topped with a hosebarb adaptor that was connected to a bubbler. To the other side neck, a hosebarb adaptor was attached and connected to a nitrogen inlet. A slow nitrogen sweep was placed on the system and observed in the bubbler. The reaction mixture was allowed to heat and mix for 16 h to ensure monoglyceride formation, verified by solubility in 4 parts methanol. Next, a 900-g aliquot was transferred to a 2-L three-neck round-bottom flask. The flask was allowed to cool under a pad of $N_2$ until ready to use. In the second stage, the flask containing the alcoholysis mixture was equipped with a glass stir shaft and paddle. The flask was attached to lattice with overhead stirring. An oil bath at room temperature was raised to submerge the flask. The set point on the bath was 220° C. and heating and stirring were started. To the flask were added, purified isophthalic acid, phthalic anhydride and xylenes (2% on total charge). Then, a Dean-Stark trap was connected to one of the side joints and topped with a Friedrichs condenser connected to a bubbler. To the other side joint, a hosebarb adapter was attached that was connected to the nitrogen inlet. A nitrogen sweep was placed on the system. The system was allowed to heat (~220° C.) and the water formed was distilled out as an azeotrope with xylenes. After 3 h, 1-2 g of the reaction mixture was collected and titrated with KOH using ASTM Method D1639 to determine the acid value (AV). The reaction was allowed to progress until the AV was between 8 and 10, then the reaction contents were poured into a glass jar and allowed to cool to room temperature under a pad of nitrogen. The relative composition of the monomers added were 23.79% pentaerythritol, 46.30% sunflower oil, 11.97% isophthalic acid and 17.95% phthalic acid by weight.

An aqueous dispersion of the alkyd resin was prepared by heating the above resin to 95° C. for 8 to 12 h to form a molten state and then feeding it into a rotor-stator mixer at rate of 50 g/min. A 28 percent (weight/weight) ammonium hydroxide solution was fed at 0.346 g/min and blended with additional water pumped at a rate of 22.0 g/min and additional E-sperse 100 surfactant (Ethox Chemicals, 60 percent active) pumped at a rate of 3.33 mL/min and injected into the mixer to create the high internal phase emulsion. The mixer speed was set at approximately 700 rpm. The high internal phase emulsion had a solids content of 66% by weight. The high internal phase emulsion was further diluted by adding water at 23 g/min to the initial high internal phase emulsion, thereby forming the alkyd dispersion Intermediate 10. The alkyd dispersion was characterized for solids, pH and particle size (53.7% solids, pH of 8.1, particle size=188 nm, $T_g$=–10° C., and MFFT<0° C.).

Hybrid Binder Preparative Examples

In the following examples, it was determined that the imbibed polymer composites contained a substantial absence of monomer droplets and particulates derived from polymerization within such monomer droplets, by optical microscopy, TEM microscopy; an increase in average particle size was confirmed by light scattering.

Example 1

Preparation of Intermediate Latex Modified with a Thermoplastic PolyUrethane Polymer Intermediate Latex 1 (375.0 g) was charged into a flask and diluted with deionized water (266.4 g). Surfactant C (2.8 g) was added to the latex with stirring over 15 min. The pH of the latex was adjusted to between 6.0 and 7.0 by slowly adding TEA (0.3 g). The diol (UD, 15.0 g) was added slowly and the latex was stirred for 30 min. The diisocyanate (IPDI, 39.8 g) was then added dropwise over 10 min, and then stirred for 10 additional min. The contents of the flask were heated to 85° C. and held for 3 h, after which time the flask was cooled to below 30° C. The pH of the final latex was adjusted to between 8.5 to 9.5 with TEA (1.3 g), passed through a 100-mesh screen and characterized for % solids, pH, particle size, $T_g$ and MFFT (Table 3).

Example 2

Preparation of Intermediate Latex Modified with a Thermoplastic PolyUrethane Polymer Intermediate Latex 5 was charged into a flask (325.0 g) and diluted with deionized water (230.2 g). Surfactant C (2.4 g) was added to the latex with stirring over 15 min. The pH of the latex was adjusted to between 6.0 and 7.0 by slowly adding TEA (0.2 g). The diol (UD, 13.0 g) was added slowly and the latex was stirred for 1 h. The diisocyanate (IPDI, 20.0 g) was then added dropwise over 10 min, and the mixture was stirred for 30 min. The contents of the flask were heated to 85° C. and held for 3 h. After 3 h, the flask was cooled to below 30° C. The pH of the final latex was adjusted to 8.5 to 9.5 with TEA (1.6 g), passed through a 100-mesh screen and characterized for solids, pH, particle size, $T_g$ and MFFT (Table 3).

Examples 3-4

Preparation of Intermediate Latex Modified with a Thermoplastic PolyUrethane Polymer Examples 3-4 were prepared using substantially the same procedure as detailed for Example 2, except that the reactor contents were stirred for 1 h after the addition of the diisocyanate. The % solids pH, particle size, $T_g$ and MFFT are detailed in Table 3. Table 3 shows an increase in MFFT for Examples 1 and 3.

TABLE 3

Latexes Modified with PolyUrethane using a 1:1 Molar Ratio Diisocyanate to Diol

|  | Ex. 1 | Ex. 2 | Ex. 3 | Ex. 4 |
| --- | --- | --- | --- | --- |
| Int. Latex | Int. 1 | Int. 4 | Int. 1 | Int. 4 |
| Int. Latex (g) | 375.0 | 325.0 | 325.0 | 375.5 |
| DI Water (g) | 266.4 | 230.2 | 230.8 | 259.5 |
| Surfactant C (g) | 2.8 | 2.4 | 2.5 | 2.8 |
| TEA (g) | 0.3 | 0.2 | 0.3 | 0.2 |
| UD (g) | 15.0 | 13.0 | — | — |
| T250 (g) | — | — | 13.0 | 15.0 |
| IPDI (g) | 39.8 | 20.0 | 26.1 | 13.4 |
| TEA final (g) | 1.3 | 1.6 | 2.2 | 2.4 |
| % HEMA | 10% | 0% | 10% | 0% |
| % diol reacted (g) | 56% | 47% | 46% | 40% |
| Latex solids | 35% | 34 & | 35% | 32% |
| Particle Size (nm) | 213 | 218 | 214 | 213 |
| pH | 9.2 | 8.6 | 9.1 | 9.1 |
| $T_g$ (° C.) | 35 | 24 | 23 | 17 |
| MFFT (° C.) | 38 | 25 | 33 | 27 |

Example 5

Preparation of Intermediate Latex Modified with a Thermoplastic Poly(Urethane-Urea) Polymer Intermediate Latex 5 was charged into a flask (400.1 g) and diluted with deionized water (276.1 g). Surfactant C (3.1 g) was added to the latex with stirring over 15 min. The pH of the latex was adjusted to between 6.0 and 7.0 by slowly adding TEA (0.1 g). The diol (UD, 16.0 g) was added slowly and the latex was stirred for 30 min. The diisocyanate (H12MDI, 43.7 g) was added dropwise over 10 min, and stirring was continued for 30 min. The contents of the flask were heated to 85° C. and held for 3 h, after which time the flask was cooled to below 30° C.; EDA (4.1 g) was added slowly with stirring for 15 min. The final latex was passed through a 100-mesh screen, and characterized for solids, pH, particle size, $T_g$ and MFFT (Table 4).

Examples 6-11 were prepared using substantially the same procedure as detailed for Example 5, except that the stirring time after the addition of the diol varied from 30 min to 1 h and the stirring time after the addition of the diisocyanate varied from 10 min to 1 h. The weights for the individual charges used are detailed in Table 4. Example 10 did not contain TEA neutralizer.

Example 12

Preparation of Intermediate Latex Modified with a Thermoplastic Poly(Urethane-Urea) Polymer Intermediate Latex 2 was charged into a flask (300.2 g) and diluted with deionized water (151.1 g). Surfactant C (50% of total surfactant, 2.2 g) was added to the latex with stirring over 15 min. The diol (UD, 12.0 g) was added slowly and the latex was stirred for 1 h. The diisocyanate (IPDI, 47.9 g) was mixed with deionized water (18.0 g) and Surfactant C (50% of total surfactant, 2.2 g). A fine emulsion was obtained by homogenization of the mixture at 30 rpm for 2 min using a Tissue Tearor handheld homogenizer (Model 398, BioSpec Products). The resulting emulsion was added to the reactor dropwise over 10 min, and then stirred for an additional 1 h. The contents of the flask were heated to 85° C. and held for 3 h, after which time the flask was cooled to below 30° C.; EDA (3.5 g) was then added slowly with stirring for 15 min. The final latex was passed through a 100-mesh screen, and characterized for solids, pH, particle size, $T_g$ and MFFT (Table 4).

Example 13 was prepared using substantially the same procedure as detailed for Example 12. The % solids pH, particle size, $T_g$, and MFFT are detailed in Table 4. The composition in Table 4 with HEMA in the acrylic polymer show increases in $T_g$ and/or MFFT.

TABLE 4

Acrylic Latexes Modified with PolyUrethane-Urea using a 1.5:1 molar ratio of Diisocyanate to Diol. Excess isocyanate reacted with diamine.

|  | Ex. 5 | Ex. 6 | Ex. 7 | Ex. 8 | Ex. 9 | Ex. 10 | Ex. 11 | Ex. 12 |
|---|---|---|---|---|---|---|---|---|
| Int. Latex | Int. 4 | Int. 4 | Int. 1 | Int. 4 | Int. 1 | Int. 3 | Int. 2 | Int. 2 |
| Int. Latex (g) | 400.1 | 325.0 | 375.5 | 325.1 | 325.2 | 300.3 | 300.2 | 300.3 |
| DI Water (g) | 276.1 | 224.4 | 266.4 | 224.5 | 230.8 | 179.3 | 179.1 | 165.1 |
| Surfactant C (g) | 3.1 | 2.4 | 2.8 | 2.4 | 2.4 | 2.3 | 4.4 | 4.5 |
| TEA (g) | 0.1 | 0.1 | 0.2 | 0.1 | 0.4 | 0.1 | — | — |
| UD (g) | 16.0 | 13.0 | 15.0 | — | — | — | 12.0 | — |
| T250 (g) | — | — | — | 13.0 | 13.0 | 12.0 | — | 12.0 |
| IPDI (g) | — | 30.1 | 59.9 | 17.4 | 39.1 | — | 47.9 | 18.2 |
| H12MDI (g) | 43.7 | — | — | — | — | 42.6 | — | — |
| EDA (g) | 4.1 | 3.3 | 6.5 | 1.9 | 4.3 | 3.2 | 3.5 | 2.6 |
| Percent HEMA | 0% | 0% | 10% | 0% | 10% | 5% | 10% | 10% |
| % diol reacted (g) | 59% | 61% | 73% | 41% | 50% | 41% | 89% | 45% |
| Latex solids | 35% | 35% | 37% | 33% | 35% | 38% | 39% | 38% |
| Particle Size (nm) | 221 | 215 | 221 | 210 | 218 | 208 | 229 | 211 |
| pH | 10.5 | 10.2 | 10.5 | 9.8 | 10.2 | 9.1 | 10.3 | 10.1 |
| $T_g$ (° C.) | 25 | 25 | 39 | 25 | 29 | 28 | 31 | 28 |
| MFFT (° C.) | 28 | 28 | 44 | 27 | 35 | 33 | 42 | 37 |

Example 13

Preparation of Intermediate Latex Modified with a Thermoplastic PolyUrea Polymer Intermediate Latex 3 (300.1 g) was charged into a flask and diluted with deionized water (100.8 g). Surfactant C (2.4 g) was added to the latex with stirring over 15 min. The diisocyanate (H12MDI, 17.9 g) was mixed with deionized water (26 g) and Surfactant C (1.2 g) and homogenized at 30 rpm for 5 min using a Tissue Tearor handheld homogenizer (Model 398, BioSpec Products). The resulting emulsion was added to the reactor dropwise over 3 min, and then stirred for an additional 1 h. The diamine (SD231, 12.0 g) was mixed with deionized water (12.3 g) and Surfactant C (1.3 g) and stirred until homogeneous. The diamine solution was added slowly over 10 min and the reaction temperature was set to 50° C. The contents of the flask were heated at 50° C. for 2 h. After 2 h, the flask was cooled to below 30° C. The final latex was passed through a 100-mesh screen, and characterized for solids, pH, particle size, $T_g$ and MFFT (Table 6).

Example 14

Preparation of Intermediate Latex Modified with a Thermoplastic PolyUrea Polymer Intermediate Latex 3 was charged into a flask (299.6 g) and diluted with deionized water (99.7 g). Surfactant C (1.6 g) was added to the latex with stirring over 15 min. The diisocyanate (H12MDI, 21.7 g) was mixed with deionized water (14.6 g) and Surfactant C (1.5 g). A fine emulsion was obtained by homogenization of the mixture at 30 rpm for 5 min using a Tissue Tearor handheld homogenizer (Model 398, BioSpec Products). The resulting emulsion was added to the reactor dropwise over 6 min, and then stirred for an additional 1 hour. The diamine (D230, 12.0 g) was mixed with deionized water (20.3 g) and Surfactant C (1.5 g) and stirred until homogeneous, then added slowly over 10 min. The contents of the flask were heated at 30° C. for 3 h, after which time the flask was cooled to below 30° C. The final latex was passed through a 100-mesh screen, and characterized for solids, pH, particle size, $T_g$ and MFFT (Table 5). After modification, the MFFT increases compared with Intermediate 3 for Examples 13 and 14, as shown in Table 5.

TABLE 5

Latexes Modified with PolyUrea using a 1:1 molar ratio of Diisocyanate to Diamine

|  | Ex. 13 | Ex. 14 |
|---|---|---|
| Int. Latex | Int. 3 | Int. 3 |
| Int. Latex (g) | 300.1 | 299.6 |
| DI Water (g) | 139.1 | 134.6 |
| Surfactant C (g) | 4.9 | 4.6 |
| H12MDI (g) | 17.9 | 21.7 |
| D230 (g) | — | 12.0 |
| SD231 (g) | 12.0 | — |
| Percent HEMA | 5% | 5% |
| % diamine reacted (g) |  |  |
| Latex solids | 40% | 40% |
| Particle Size (nm) | 194 | 199 |
| pH | 6.3 | 9.8 |
| $T_g$ (° C.) | 28 | 27 |
| MFFT (° C.) | 34 | 39 |

Example 15

Preparation of Intermediate Latex Modified with a Thermoplastic Poly(Hydroxyaminoether) Polymer D.E.R.-331 Liquid Epoxy Resin (30.2 g), deionized water (15.2 g) and Surfactant C (10.4 g) were mixed in a glass jar. The mixture was stirred for 15 min with a magnetic stirrer, then homogenized at 30 rpm for 3 min using a Tissue Tearor handheld homogenizer (Model 398, BioSpec Products). Intermediate latex 5 was then added to the epoxy emulsion with stirring. The contents of the jar were agitated for 1 h, at which time more de-ionized water was added (15.0 g). Stirring was continued for an additional 20 min after which time an amine solution (5.3 g n-butyl amine, 6.37 g deionized water, and 0.36 g Surfactant C) was added over 15 min. After stirring for 3 h, the final latex was passed through a 100-mesh screen, and characterized for solids, pH, particle size, $T_g$ and MFFT (Table 6).

Examples 16-20

Preparation of Intermediate Latex Modified with a Thermoplastic Poly(Hydroxyaminoether) Polymer Examples 16-20 were prepared using substantially the same procedure as detailed for Example 15. The solids, pH, particle size, $T_g$ and MFFT are detailed in Table 6. These results show that the effect of the step-growth polymer on the $T_g$ and MFFT depends on the acrylic latex $T_g$ and the amine used.

TABLE 6

Acrylic Latexes Modified with Poly(HydroxyAminoEther) Polymers

|  | Ex. 15 | Ex. 16 | Ex. 17 | Ex. 18 | Ex. 19 | Ex. 20 |
|---|---|---|---|---|---|---|
| Int. Latex | Int. 5 | Int. 6 | Int. 7 | Int. 7 | Int. 7 | Int. 8 |
| Int. Latex (g) | 300.0 | 300.0 | 300.0 | 300.0 | 300.0 | 300.0 |
| D.E.R 331 (g) | 30.2 | 30.3 | 30.9 | 30.9 | 30.9 | 30.1 |
| D.E.R Emulsion Water | 15.2 | 15.3 | 15.9 | 15.9 | 15.9 | 15.1 |
| D.E.R Surfactant C (g) | 10.4 | 10.4 | 10.6 | 10.6 | 10.6 | 10.3 |
| n-butylamine (g) | 5.3 | 5.3 | 5.4 | — | — | — |
| ethanolamine (g) | — | — | — | 4.5 | — | — |
| cyclohexylamine (g) | — | — | — | — | 7.4 | 7.2 |
| Amine Water (g) | 6.4 | 6.4 | 6.5 | 5.4 | 8.8 | 8.6 |
| Amine Surfactant C (g) | 0.36 | 0.37 | 0.37 | 0.31 | 0.51 | 0.49 |
| Latex solids | 51% | 50% | 51% | 51% | 51% | 49% |
| Particle Size (nm) | 157 | 152 | 147 | 150 | 151 | 151 |
| pH | 9.3 | 9.9 | 10.0 | 9.8 | 9.7 | 9.3 |
| $T_g$ (° C.) | −2 | 15 | 35 | 44 | 32 | 30 |
| MFFT (° C.) | 16 | 19 | 36 | 42 | 36 | 37 |

Examples 21-23 were prepared using substantially the same procedure as detailed for Example 15 with AVANSE™ MV-100 Acrylic Resin (a Trademark of The Dow Chemical Company or its Affiliates) as the Intermediate latex (50.5% solids, particle size=130 nm, $T_g$=14° C.). The procedure was changed such that a large masterbatch of the acrylic resin was modified with D.E.R 331 Liquid Epoxy resin first. This masterbatch was subsequently split into 300-g portions that were reacted with various amines. The amounts of acrylic resin, epoxy resin, Surfactant C and deionized water that are in 300 g of the masterbatch are shown in rows 1-4 of Table 7. The % solids, pH, particle size, $T_g$ and MFFT are detailed in Table 7.

TABLE 7

AVANSE MV-100 Acrylic Resin Modified with Poly(Hydroxyaminoether)

|  | Ex. 21 | Ex. 22 | Ex. 23 |
|---|---|---|---|
| Int. Latex (g) | 206.0 | 206.0 | 206.0 |
| DI Water (g) | 61.5 | 61.5 | 61.5 |
| Surfactant C (g) | 5.5 | 5.5 | 5.5 |
| D.E.R 331 (g) | 27.0 | 27.0 | 27.0 |
| Ethanolamine (g) | 4.0 | — | — |
| n-Butylamine (g) | — | 4.7 | — |
| Cyclohexylamine (g) | — | — | 6.4 |
| Amine Water (g) | 4.9 | 5.8 | 8.0 |
| Amine Surfactant C (g) | 0.36 | 0.36 | 0.46 |
| Latex solids | 45% | 44% | 44% |
| Particle Size (nm) | 150 | 158 | 152 |
| pH | 9.9 | 10.0 | 10.0 |
| $T_g$ (° C.) | 21 | 23 | 21 |
| MFFT (° C.) | 18 | 18 | 18 |

Example 24

Preparation of Intermediate Polyurethane Dispersion Modified with a Thermoplastic Poly(Hydroxyaminoether)

An epoxy emulsion was made by first adding a mixture of D.E.R. 331 Liquid Epoxy Resin (128.0 g) and Surfactant C (12.8 g) to deionized water (72.0 g) with stirring, followed by homogenization using a handheld homogenizer (IKA Ultra Turrax T-25 Basic, 6500 rpm) for 5 min. Surfactant C (0.82 g), deionized water (14.7 g) and the epoxy emulsion (17.88 g) were added to Intermediate 9 (130 g). The mixture was stirred for 2 h after the addition of the epoxy emulsion. A solution of n-butyl amine (2.1 g in 3.9 g deionized water) was added dropwise to the mixture over 5 min with agitation, diluted with additional deionized water (20 g) and stirred for 2 h before letting the material sit overnight.

Intermediate 9 and Example 24 were both drawn down to make films with a dry film thickness of 2 mils, and left to dry for 1 week. The surface of each film was then treated with to 2-cm diameter pools of Formula 409 cleaner, 50% ethanol, isopropyl alcohol, and methyl ethyl ketone 1 h to test chemical resistance. All four chemicals dramatically softened or totally dissolved the film cast from Intermediate 9. The film cast from Example 24 showed no visible damage from any of the four chemicals.

TABLE 8

Comparison of Modified vs. Unmodified Polyurethane Latex

|  | Red Ink | 409 | MEK | 50% EtOH | IPA |
|---|---|---|---|---|---|
| Int. 9 | 6 | 4 | 1 | 3 | 1 |
| Ex. 24 | 10 | 10 | 10 | 10 | 10 |

1-10 scale where 10 means no sign of any damage and 1 corresponds to complete removal of film.

Example 25

Preparation of Intermediate Acrylic Latex Modified with a Thermoplastic Poly(Hydroxyaminoether)

The epoxy emulsion was prepared using substantially the same procedure as detailed in Example 24. Surfactant C (0.6 g), deionized water (12 g) and the D.E.R 331 emulsion (13.13 g) were added to 100 g of a ROSHIELD™ 3188 Self Crosslinking Acrylic emulsion (a Trademark of The Dow Chemical Company or its Affiliates, 33.6% solids, particle size=110 nm). After completion of addition, the mixture was stirred for 2 h. n-Butylamine (1.3 g) was then added dropwise to the latex over 5 min. The mixture was stirred for 2 h then left to sit overnight. The acrylic emulsion and the Example 25 latex were drawn down to form thin films on an oak board. Example 25 had better visual warmth, providing a desirable reddish yellow hue that is not provided by the control acrylic formulation.

Examples 26-27

Preparation of Intermediate Alkyd Dispersion Modified with a Thermoplastic Poly(Hydroxyaminoether)

Examples 26-27 were prepared using substantially the same procedure as detailed for Example 15 with Intermediate 10 being modified. In this procedure a large masterbatch of Intermediate 10 was first modified with D.E.R 331 Liquid Epoxy resin. This masterbatch was subsequently split into 150-g portions, which were reacted with ethanol amine and n-butyl amine, respectively. The amounts of Intermediate 10, the epoxy resin, Surfactant C and deionized water that are in 150 g of the masterbatch are shown in rows 1-4 of Table 9. The % solids, pH, particle size, $T_g$ and MFFT are detailed in rows 5-9 in Table 9.

TABLE 9

Alkyd Dispersion Modified with Poly(Hydroxyaminoether)

|  | Ex. 27 | Ex. 28 |
|---|---|---|
| Int. Latex 11 (g) | 119.7 | 119.7 |
| DI Water (g) | 13.2 | 13.2 |
| Surfactant C (g) | 4.3 | 4.3 |
| D.E.R 331 (g) | 12.9 | 12.9 |
| Ethanolamine (g) | 1.89 | — |
| n-Butylamine (g) | — | 2.26 |
| Amine Water (g) | 2.3 | 2.7 |
| Amine Surfactant C (g) | 0.14 | 0.17 |
| Latex solids | 55% | 50% |
| Particle Size (nm) | 203 | 205 |
| pH | 9.5 | 9.2 |
| $T_g$ (° C.) | −4 | −6 |
| MFFT (° C.) | 1 | 0 |

Coating Examples 1, 2, and 4 and Intermediate 1

Coating Applications of Latexes Modified with PolyUrethane Using 1:1 Molar Ratio of Diisocyanate to Diol Along with Unmodified Control Latex The coating formulations of an unmodified control latex intermediate (C-Int.1) and the latexes modified with PolyUrethane using 1:1 molar ratio of diisocyanate to diol (Ex. 1, Ex. 2 and Ex. 4) for clear wood coatings are shown in Table 10. ButylCarb is Butyl CARBITOL™ Diethylene Glycol Monobutyl Ether (A Trademark of the Dow Chemical Company or its Affiliates). Surf 104 DPM is Surfynol 104 surfactant (50% in dipropylene glycol monomethyl ether); and Zonyl FS 610 is Zonyl FS-610 fluorosurfactant. Each of the ingredients was added gradually and mixed with a bench top overhead mixer.

TABLE 10

Clear Coating Formulations of Latexes Modified with PolyUrethane using 1:1 Molar Ratio of Diisocyanate to Diol along with Unmodified Control Latex

| | Coating ID | | | |
|---|---|---|---|---|
| | C-Int 1 | C-Ex. 1 | C-Ex. 2 | C-Ex. 4 |
| Latex ID | Int. 1 | Ex. 1 | Ex. 3 | Ex. 4 |
| Latex (g) | 80.00 | 113.77 | 115.94 | 123.95 |
| ButylCarb. (g) | 6.00 | 8.00 | 6.78 | 5.64 |
| Surf 104 DPM (g) | 0.25 | 0.25 | 0.25 | 0.25 |
| Zonyl FS-610 (g) | 0.06 | 0.06 | 0.06 | 0.06 |
| DI Water (g) | 25.00 | 0 | 0 | 0 |
| Formulation Solid (%) | 36% | 33% | 33% | 31% |

Konig Hardness, Stain Resistance, and Chemical/Solvent Resistance properties of comparative example C-Int 1 and examples C-Ex. 1, 2, and 4 are shown in Table 11. The above formulations were applied to treated aluminum panels at a wet film thickness of 10 mils, in accordance with ASTM D-823-95 procedure E, to give a dry film thickness of about 2 mils. Pendulum (Konig) Hardness was tested on the panels using ASTM D4366-95 with Amplitude limit, 6° to 3° and period of oscillation, 1.4 s after 7 days of drying at ambient temperature and 50% relative humidity and with additional 5 days of drying in a 60° C. oven, respectively. Stain Resistance and Chemical/Solvent resistance were spot tested on oven dried panels as follows: Round fiber disks were soaked with different chemicals or solvents and placed on the coating and covered with lids. After ~1 h, the caps and disks were removed and the panels wiped lightly. The coatings were rated for film damage using the following scale, 10-9=no damage or discoloration, 8-7=slight swelling, blistering or wrinkling, dulling, yellowing, 6-5=moderate swelling, blistering or wrinkling, 4-3=severe swelling, blistering or wrinkling and 2-0=dissolved, delaminated or badly discolored.

An improvement in Konig hardness, Stain resistance, and Chemical/Solvent resistance was observed for the modified latexes over the intermediate latex control, especially for the latexes with hydroxyl functionality.

TABLE 11

Coating Properties of Formulations Given in Table X

| | Coating ID | | | |
|---|---|---|---|---|
| | C-Int. 1 | C-Ex. 1 | C-Ex. 2 | C-Ex. 4 |
| Konig Hardness (Seconds) | | | | |
| 1 week RT dry | 19.60 | 57.60 | 70.30 | 39.40 |
| 1 week RT and 5 days 60° C. oven dry | 80.00 | 126.50 | 118.10 | 74.50 |
| Stain Resistance (0-10, 10 = best) | | | | |
| Red Ink | 8 | 10 | 9 | 8 |
| Formula 409 | 7 | 9 | 10 | 7 |
| water | 6 | 10 | 9 | 7 |
| Mustard | 8 | 8 | 8 | 8 |
| Total Score | 29 | 37 | 36 | 30 |
| Chemical/Solvent Resistance (0-10, 10 = best) | | | | |
| Brake Fluid | 1 | 8 | 8 | 6 |
| MEK | 1 | 9 | 9 | 2 |
| Acetone | 3 | 5 | 5 | 3 |
| IPA | 1 | 3 | 5 | 1 |
| 50% EtOH | 5 | 3 | 5 | 1 |
| Total Score | 11 | 28 | 32 | 13 |

Coating Examples 5, 6, 8 and 9

Coating Applications of Latexes Modified with PolyUrethane Using 1.5:1 Molar Ratio of Diisocyanate to Diol The formulations of latexes modified with PolyUrethane using 1.5:1 molar ratio of diisocyanate to diol (Ex. 5, Ex. 6, Ex. 8 and Ex. 9) for clear wood coatings are listed in Table 12 with the same ingredients as in Table 10.

Konig Hardness, Stain Resistance and Chemical/Solvent Resistance properties of Coating Examples 5, 6, 8, and 9 are listed in Table 13. They were tested in the same way as for Coating Examples 1, 2, and 4.

As for Coating Examples 1, 2, and 4, an improvement in Konig hardness, Stain resistance and Chemical/Solvent resistance was observed for the modified latexes over the intermediate latex control (C-Int. 1), especially for the latexes with hydroxyl functionality.

TABLE 12

Clear Coating Formulations of Latexes Modified with PolyUrethane using 1.5:1 Molar Ratio of Diisocyanate to Diol

| | Coating ID | | | |
|---|---|---|---|---|
| | C-Ex. 5 | C-Ex. 6 | C-Ex. 8 | C-Ex. 9 |
| Latex ID | Ex. 5 | Ex. 6 | Ex. 8 | Ex. 9 |
| Latex (g) | 115.17 | 115.54 | 121.32 | 114.29 |
| ButylCarb. (g) | 5.54 | 5.70 | 5.44 | 7.26 |
| Surf 104 DPM (g) | 0.25 | 0.25 | 0.25 | 0.25 |
| Zonyl FS-610 (g) | 0.06 | 0.06 | 0.06 | 0.06 |
| Formulation Solid (%) | 33% | 33% | 31% | 33% |

TABLE 13

Coating Properties of Formulations Given in Table 12

|  | C-Ex. 5 | C-Ex. 6 | C-Ex. 8 | C-Ex. 9 |
|---|---|---|---|---|
| Konig Hardness (Seconds) | | | | |
| 1 week RT dry | 30.90 | 28.10 | 30.90 | 66.10 |
| 1 week RT and 5 days 60 C oven dry | 99.90 | 108.30 | 81.60 | 120.90 |
| Stain Resistance (0-10, 10 = best) | | | | |
| Red Ink | 9 | 9 | 8 | 7 |
| Formula 409 | 8 | 8 | 7 | 9 |
| water | 8 | 9 | 8 | 9 |
| Mustard | 8 | 8 | 8 | 8 |
| Total Score | 33 | 34 | 31 | 33 |
| Chemical/Solvent Resistance (0-10, 10 = best) | | | | |
| Brake Fluid | 6 | 6 | 6 | 8 |
| MEK | 1 | 1 | 1 | 8 |
| Acetone | 4 | 3 | 3 | 5 |
| IPA | 2 | 2 | 2 | 5 |
| 50% EtOH | 5 | 2 | 2 | 5 |
| Total Score | 18 | 14 | 14 | 31 |

Coating Examples 15-17 and Intermediates 5-7

Coating Applications of Latexes Modified with Poly(HydroxyAminoEther) Along with Unmodified Control Latexes The formulations for C-Int. 5-7 and Examples 15-17 for direct-to-metal coatings are shown in Table 14. TAMOL™ 2001 refers to TAMOL™ 2001 pigment dispersant (A Trademark of The Dow Chemical Company or its Affiliates); DOWANOL™ DPM refers to DOWANOL™ DPM Dipropylene Glycol Methyl Ether (A Trademark of The Dow Chemical Company of its Affiliates); Sodium Nitrite (15%) is 15% by weight water solution made from sodium nitrite slat from Sigma-Aldrich Company; ACRYSOL™ RM-8W refers to ACRYSOL™ RM-8W Non-ionic Urethane Rheology Modifier (A Trademark of The Dow Chemical Company or its Affiliates); Surfynol CT-111 refers to Surfynol CT-111 wetting agent; Drewplus L-493 refers to Drewplus L-493 defoamer; Ti-Pure R-706 refers to Ti-Pure R-706 TiO$_2$ pigment; Texanol refers to Texanol coalescent; and Drewplus L-493 refers to Drewplus L-493 defoamer.

All liquid ingredients in the grind section except for the pigment were placed in the grind pot and agitated. Then, the pigment was added and grinding continued for 25 min at about 2000 RPMs with a Cowles Dissolver to a Hegman 7+ rating. In the letdown step, the pigment grind was added to the latex with stirring for 5 min. The coalescent mixture (coalescent and water) was then added and stirring was continued for an additional 15 min. The remaining ingredients were added and stirring was continued for 20 min. The initial and 5 day viscosity was measured and reported in Krebs units (KU), using a Stormer viscometer.

The KU viscosity increase over 5 days for the modified latexes (C-Ex. 15-17) is similar to the increase for the controlled latexes (C-Int. 5-7), which indicates that the latexes modified with the poly(hydroxyamino ether) polyamine polymer did not compromise the ability to formulate the anionic/nonionic pigmented coatings.

TABLE 14

Coating Formulations of Latexes Modified with Poly(HydroxyAminoEther) Polymers along with Unmodified Control Latexes

|  | C-Int 5 | C-Int 6 | C-Int 7 | C-Ex. 15 | C-Ex. 16 | C-Ex. 17 |
|---|---|---|---|---|---|---|
| Grind | | | | | | |
| water | 50.00 | 50.00 | 50.00 | 50.00 | 50.00 | 50.00 |
| TAMOL ™ 2001 | 7.86 | 7.86 | 7.86 | 7.86 | 7.86 | 7.86 |
| Surfynol CT-111 | 2.00 | 2.00 | 2.00 | 2.00 | 2.00 | 2.00 |
| Drewplus L-493 | 1.00 | 1.00 | 1.00 | 1.00 | 1.00 | 1.00 |
| Ammonia (28%) | 2.00 | 2.00 | 2.00 | 2.00 | 2.00 | 2.00 |
| Ti-Pure R-706 | 220.00 | 220.00 | 220.00 | 220.00 | 220.00 | 220.00 |
| Letdown | | | | | | |
| Latex ID | Int. 5 | Int. 6 | Int. 7 | Ex. 15 | Ex. 16 | Ex. 17 |
| Latex (g) | 543.25 | 542.75 | 530.25 | 540.00 | 545.25 | 536.50 |
| water | 166.75 | 145.75 | 127.25 | 170.00 | 140.75 | 118.25 |
| Ammonia (15%) | 3.50 | 3.50 | 3.50 | 3.50 | 3.50 | 3.50 |
| Texanol | 6.75 | 11.00 | 48.00 | 6.75 | 11.00 | 48.00 |
| DOWANOL ™ DPM | 8.00 | 24.00 | 16.00 | 8.00 | 24.00 | 16.00 |
| Sodium Nitrite (15%) | 9.00 | 9.00 | 9.00 | 9.00 | 9.00 | 9.00 |
| ACRYSOL ™ RM -8W | 2.12 | 3.60 | 2.04 | 2.24 | 3.08 | 2.12 |
| PVC | 17.86 | 17.81 | 17.87 | 17.87 | 17.88 | 17.88 |
| Volume Solids | 36.71 | 36.73 | 36.76 | 36.69 | 36.72 | 36.68 |
| pH | 9.37 | 9.54 | 9.2 | 9.34 | 9.47 | 9.29 |
| Viscosity | | | | | | |
| Initial | 81 KU | 86 KU | 91 KU | 60 KU | 72 KU | 71 KU |
| 5 day | 91 KU | 105 KU | 111 KU | 72 KU | 96 KU | 86 KU |
| Difference | 10 KU | 19 KU | 20 KU | 12 KU | 24 KU | 15 KU |

Gloss, Konig Hardness, Pencil Hardness, Block-Resistance and Dirt Pick Up Resistance properties of comparative examples C-Int. 5-7 and examples C-Ex. 15-17 are shown in Table 15. The above formulations were applied to treated aluminum panels at a wet film thickness of 10 mils, in accordance with ASTM D-823-95 procedure E, to give a dry film thickness of about 2 mils.

Gloss was determined by ASTM D-523-89 (re-approved 1999) test method at 20, 60 and 85 degrees after different drying time at ambient temperature and 50% relative humidity. Pendulum (Koenig) Hardness was tested on the same panels using ASTM D4366-95 with Amplitude limit, 6° to 3° and period of oscillation, 1.4 s. Pencil hardness was tested using ASTM D3363-05 Standard Test Method with the same panels as for the gloss measurement.

Block Resistance was measured with draw downs made on treated aluminum panels. After drying 2 weeks in the controlled temperature room (CTR), 1½" squares were cut from the draw downs, placed face-to-face and tested in one of two ways: a) overnight at room temperature in the CTR and b) ½ h in a 140° F. oven. In each test, a #8 stopper and 1 kilogram weight were placed on top of the squares. The ratings are based on the ease of separating the face-to-face placed 1½" squares and the damage on the coated surface after the separation. The ratings range from 0 to 10 with 0 being the worst, where the face-to-face placed 1½" squares cannot be separated without completely damaging them film; and 10 being the best, where the face-to-face placed 1½" squares can be separated without any force after the 1 kg weight is removed.

Dirt Pick-Up Resistance (DPUR) was measured also on treated aluminum panels. After panels dried in the CTR for 2 weeks, the dirt pickup resistance test was done. Y-reflectance and L.a.b. values were taken. Then panels were placed into the fog box for 1½ hours, then removed and patted dry; then iron oxide slurry (~0.8 g) was applied. Panels were air dried in the lab for 3 h and then placed into a 140° F. oven for 1 h, after which time the panels were removed and allowed to cool for ~½ h. Each panel was then washed under tepid running water using an individual cheesecloth pad for each panel. Panels were patted dry and allowed to sit in the lab overnight. Y-reflectance and L.a.b. measurements were recorded over the stained portion of each panel again. The Y-reflectance before and after dirt treatment and its percentage of retention were calculated and shown in Table 15. The higher percentage of Y-reflectance retention means lower dirt pick and better dirt pick up resistance.

An improvement in Dirt Pick-Up Resistance and Konig hardness and Block resistance were observed for the modified latexes over the intermediate latex controls, especially for the latexes with lower glass transition temperatures.

TABLE 15

Coating Properties of Formulations of Table 14

| Coating ID | C-Int 5 | C-Int 6 | C-Int 7 | C-Ex. 15 | C-Ex. 16 | C-Ex. 17 |
|---|---|---|---|---|---|---|
| Gloss | | | | | | |
| DFT on aluminum | 2.41 mil | 2.56 mil | 2.63 mil | 2.23 mil | 2.40 mil | 2.46 mil |
| 20° Gloss | | | | | | |
| 2 week 60° Gloss | 41 | 52 | 71 | 32 | 40 | 49 |
| 2 week 85° Gloss | 75 | 79 | 85 | 68 | 73 | 78 |
| 2 week Konig (second) | 94 | 95 | 96 | 94 | 94 | 95 |
| 2 day | 2.7 | 5.5 | 8.3 | 4.1 | 8.3 | 8.3 |
| 1 week | 2.7 | 9.2 | 10.3 | 4.6 | 12.2 | 11.5 |
| 2 week | 2.7 | 11.2 | 12.6 | 6.3 | 14.4 | 14.3 |
| 3 week | 2.7 | 11.1 | 12.9 | 6.5 | 14.7 | 15.4 |
| 4 week | 2.7 | 11.1 | 13.2 | 5.5 | 14.0 | 15.4 |
| Pencil Hardness | | | | | | |
| 2 day | <6 B | <6 B | <6 B | <6 B | <6 B | <6 B |
| 1 week | 5 B | 3 B | 3 B | 4 B | 3 B | 4 B |
| 2 week | 5 B | 4 B | 3 B | 5 B | 3 B | 3 B |
| 3 week | 5 B | 3 B | 3 B | 4 B | 3 B | 3 B |
| Block Resistance-2 week dry in CTR (Scale 0-10, 10 is best) | | | | | | |
| Oven Block (30 min @ 140° F.) | 1 | 3 | 2 | 4 | 4 | 2 |
| 24 hour Room Temp Block | 6 | 8 | 9 | 8 | 9 | 8 |
| Dirt Pick-Up Resistance (DPUR-2 week RT Dry) Initial | | | | | | |
| Y Reflectance After Dirt | 93.24 | 94.71 | 94.91 | 92.22 | 92.93 | 93.43 |
| Y Reflectance | 42.71 | 63.98 | 90.87 | 57.57 | 80.40 | 89.11 |
| Y Retention (%) | 46% | 68% | 96% | 62% | 87% | 95% |

Coating-Examples 21-23 Versus Control

Coating Applications of AVANSE™ MV-100 Latex Unmodified and Modified with Poly(HydroxyAminoEther)

The formulations for AVANSE™ MV-100 Latex (A Trademark of the Dow Chemical Company or its Affiliates) and Ex. 21-23 for direct-to-metal coatings studies are listed in Table 16. They were formulated with similar ingredients and in the same way.

TABLE 16

Coating Formulations of AVANSE MV-100 Latex and the Modified Latexes with Poly(HydroxyAminoEther) Polymer

| Coating ID | AVANSE™ MV-100 | C-Ex. 21 | C-Ex. 22 | C-Ex. 23 |
|---|---|---|---|---|
| Grind | | | | |
| water | 50.00 | 50.00 | 50.00 | 50.00 |
| TAMOL ™ 2001 | 7.86 | 7.86 | 7.86 | 7.86 |
| Surfynol CT-111 | 2.00 | 2.00 | 2.00 | 2.00 |
| Drewplus L-493 | 1.00 | 1.00 | 1.00 | 1.00 |
| Ammonia (28%) | 2.00 | 2.00 | 2.00 | 2.00 |
| Ti-Pure R-706 | 220.00 | 220.00 | 220.00 | 220.00 |
| Letdown | | | | |
| Latex ID | AVANSE™ MV-100 | Ex. 21 | Ex. 22 | Ex. 23 |
| Latex (g) | 540.00 | 606.00 | 619.77 | 619.77 |
| water | 146.00 | 80.00 | 66.23 | 66.23 |
| Ammonia (15%) | 3.50 | 3.50 | 3.50 | 3.50 |
| Texanol | 11.00 | 6.75 | 11.00 | 48.00 |
| DOWANOL™ DPM | 24.00 | 8.00 | 24.00 | 16.00 |
| Sodium Nitrite (15%) | 9.00 | 9.00 | 9.00 | 9.00 |
| ACRYSOL™ RM-8W | 2.12 | 1.60 | 2.28 | 3.04 |
| pH | 9.46 | 9.52 | 9.59 | 9.48 |
| Viscosity | | | | |
| Initial | 88 KU | 80 KU | 92 KU | 86 KU |
| 1 day | 95 KU | 94 KU | 100 KU | 93 KU |
| Difference | 7 KU | 14 KU | 8 KU | 7 KU |

Gloss, Konig and Pencil Hardness, Block Resistance and Dirt Pick Up Resistance properties of a coating based on AVANSE™ MV-100 Latex (comparative) and C-Ex. 21-23 are listed in Table 17. They were measured in the same way as in Coating-Examples C-Int. 5-7 and C-Ex. 15-17. In addition, Tannin and Marker Stain Blocking Resistance were also tested for the comparative latex and C-Ex. 22 and the relative comparison is reported in Table 17. Tannin block resistance was assessed by coating cedar panels with a brush with a target of 2 mils dry film thickness; a top coat was applied 2 h after application of the first coat. The coated panels were conditioned in high humidity environment for 16 to 24 h and then dried for 1 day. The relative discoloration on the coating surface was reported. The marker stain resistance was assessed similarly on Leneta Form WB, a sealed white chart with the coatings applied after the markers were drawn on the charts.

An improvement in Dirt Pick-Up Resistance and Konig hardness and Block resistance were observed for the modified latexes over the AVANSE™ MV-100 latex control for three different amines. In addition, improved performance was observed when C-Ex. 22 was tested for the Tannin and Marker Stain Blocking Resistance vs. the AVANSE™ MV-100 latex control.

TABLE 17

Coating Properties of Formulations Given in Table 16

| Coating ID | AVANSE™ MV-100 | C-Ex. 21 | C-Ex. 22 | C-Ex. 23 |
|---|---|---|---|---|
| Gloss | | | | |
| DFT on aluminum (mil) | 2.41 | 1.83 | 2.11 | 1.69 |
| 20° Gloss | | | | |
| 2 week 60° Gloss | 53 | 50 | 42 | 59 |
| 2 week 85° Gloss | 82 | 78 | 73 | 85 |
| 2 week Koenig (second) | 92 | 94 | 94 | 93 |
| 2 day | 8.3 | 12.5 | 11.8 | 13.9 |
| 5 day | 11.1 | 16.8 | 16.8 | 21.0 |
| 1 week | 11.1 | 16.8 | 16.8 | 21.0 |
| 2 week | 15.4 | 23.8 | 23.8 | 28.0 |
| 3 week | 18.2 | 28 | 25.2 | 32.3 |
| 3 wk dry/16 hr at 120° F. | 34.5 | 50.6 | 46.3 | 56.1 |
| Pencil Hardness | | | | |
| 2 day | 5 B | 5 B | 5 B | 5 B |
| 5 day | 5 B | 5 B | 3 B | 3 B |
| 1 week | 5 B | 5 B | 3 B | 3 B |
| 2 week | 3 B | 3 B | 3 B | 3 B |
| 3 week | 3 B | 3 B | 3 B | 3 B |
| 3 wk dry/16 h at 120° F. | 3 B | HB | HB | HB |
| Block Resistance-1 week dry in CTR (Scale 0-10, 10 is best) | | | | |
| Oven Block (30 min @ 140° F.) | 2 | 3 | 5 | 5 |
| 24 hour Room Temp Block | 5 | 8 | 8 | 9 |
| Dirt Pick-Up Resistance (DPUR-2 week RT Dry) | | | | |
| Initial | | | | |
| Y Reflectance After Dirt | 93.79 | 94.01 | 93.83 | 93.41 |
| Y Reflectance | 84.27 | 91.51 | 92.21 | 91.74 |
| Y Ratio | 89.85% | 97.34% | 98.27% | 98.21% |
| Tannin and Marker Stain Blocking Resistance | | | | |
| Tannin | Control | NA | + | NA |
| MSB Black Sharpie | Control | NA | = | NA |
| MSB Red Sharpie | Control | NA | = | NA |
| MSB Blue Sharpie | Control | NA | = | NA |
| MSB Green Sharpie | Control | NA | = | NA |
| MSB Black Ballpoint | Control | NA | = | NA |
| MSB Red Ballpoint | Control | NA | + | NA |
| MSB Blue Ballpoint | Control | NA | + | NA |
| MSB Blue Washable Marker | Control | NA | + | NA |
| MSB Pink Washable Marker | Control | NA | + | NA |

NA means No data available,
+ means better than the control and
= means the same as control.

The invention claimed is:

1. A composition comprising a stable aqueous dispersion of acrylic or styrene-acrylic polymer particles imbibed with a thermoplastic step-growth polymer which is a polyhydroxyamino ether, a polyhydroxythiol ether, a polyhydroxyamino ester, a polyester, a polyurethane, a polyurea, or a polysiloxane, with the proviso that when the thermoplastic step-growth polymer is a polyurethane or a polyurea, the step-growth polymer has less than 0.1 percent by weight of acid groups based on the weight of the polyurethane or polyurea and the polymer particles have less than 0.1 by weight of pendant amine groups, based on the weight of imbibed polyurethane or polyurea in the pre-reacted state.

2. The composition of claim 1 wherein the polymer particles are acrylic, or styrene-acrylic particles imbibed with a polyurethane or a polyurea.

3. The composition of claim 1 which is formulated to be suitable for a coating, an adhesive, a sealant, a primer, a caulk, a stain, or a filler.

4. A method for forming a composite comprising the step of applying the composition of claim 3 to a substrate which is a metal, plastic, concrete, wood, asphalt, hair, paper, leather, rubber, foam, or a textile.

* * * * *